United States Patent [19]

Meier et al.

[11] Patent Number: 5,045,093
[45] Date of Patent: Sep. 3, 1991

[54] GAS SEPARATING MEMBRANES FROM POLYIMIDE POLYMERS AND A PROCESS FOR USING THE SAME

[75] Inventors: Ingrid K. Meier, Easton; Michael Langsam, Allentown, both of Pa.

[73] Assignee: Air Products and Chemicals, Inc., Allentown, Pa.

[21] Appl. No.: 598,490

[22] Filed: Oct. 16, 1990

[51] Int. Cl.$^5$ ................... B01D 53/22; B01D 71/64
[52] U.S. Cl. ........................... 55/16; 55/68; 55/158
[58] Field of Search .................. 55/16, 68, 158

[56] References Cited

U.S. PATENT DOCUMENTS

| | | | |
|---|---|---|---|
| Re. 30,351 | 7/1980 | Hoehn et al. | 55/16 |
| 3,822,202 | 7/1974 | Hoehn | 55/16 |
| 3,846,521 | 11/1974 | Osterholtz | 55/16 X |
| 4,378,400 | 3/1983 | Makino | 428/220 |
| 4,528,004 | 7/1985 | Makino et al. | 55/16 X |
| 4,657,564 | 4/1987 | Langsam | 55/16 |
| 4,690,873 | 9/1987 | Makino et al. | 55/16 X |
| 4,705,540 | 11/1987 | Hayes | 55/16 |
| 4,717,393 | 1/1988 | Hayes | 55/16 |
| 4,717,394 | 1/1988 | Hayes | 55/16 |
| 4,746,474 | 5/1988 | Kohn | 55/16 X |
| 4,776,936 | 10/1988 | Smith et al. | 55/16 X |
| 4,830,640 | 5/1989 | Nakamura et al. | 55/16 X |
| 4,838,900 | 6/1989 | Hayes | 55/16 |
| 4,880,442 | 11/1989 | Hayes | 55/16 |
| 4,897,092 | 1/1990 | Burgoyne, Jr. et al. | 55/16 |
| 4,929,405 | 5/1990 | Kohn | 55/16 X |
| 4,932,982 | 6/1990 | Hayes | 55/16 |
| 4,932,983 | 6/1990 | Hayes | 55/16 |
| 4,948,400 | 8/1990 | Yamada et al. | 55/16 X |
| 4,952,220 | 8/1990 | Langsam et al. | 55/16 X |
| 4,964,887 | 10/1990 | Shimatani et al. | 55/16 |

OTHER PUBLICATIONS

T. H. Kim, et al., J. Appl. Poly. Sci., 34 1767 (1987).
Yamada, et al., Kobunshi Ronbunshu, 40(1) 35–40 (1983).

*Primary Examiner*—Robert Spitzer
*Attorney, Agent, or Firm*—Keith D. Gourley; James C. Simmons; William F. Marsh

[57] ABSTRACT

The present invention is a class of semi-permeable polyimide membranes and a process for using such membranes to separate one or more components of a gaseous mixture. The membranes are prepared from a polyimide having surface-modifiable functionalities comprising repeating units formed from an aromatic dianhydride and a bridged alkylated bisaniline wherein the bridging group of the diamine possesses restricted, rotatable rigid or low Van Der Waal energy substituents which are orthogonal to the polymer backbone. The membranes formed therefrom are contacted in the presence of an oxygen source with an activating force such as high energy electromagnetic irradiation to effect modification of the polymer surface. The surface-modified polyimide membranes exhibit high gas perm-selectivities and are especially useful in effecting the separation of oxygen and nitrogen from air.

18 Claims, 3 Drawing Sheets

FIGURE 1

POLYIMIDE PREPARATION FROM BIS(4-AMINOARYL) METHANES

| Example | $R_1$ | $R_2$ | $R_3$ | $R_4$ | Initial Reaction Temp (°C) | Polyamic Acid Reaction Time (hr) | % Solids Polyamic Acid Solution | % Solids Polyimide Solution | Tg | Polyimide Inh. Visc. | Polyimide Film Density |
|---|---|---|---|---|---|---|---|---|---|---|---|
| 1 | $CH(CH_3)_2$ | $CH(CH_3)_2$ | H | H | -10 | 17 | 20 | 10 | 275°C | .790 | 1.20 |
| 2 | $CH_3$ | $CH_3$ | $CF_3$ | $C_{10}H_7$ | -5 | 48 | 20 | 28 | 285°C | 0.335 | 1.25 |
| 3 | $CH_3$ | $CH(CH_3)_2$ | $CF_3$ | $C_6H_5$ | 25 | 65 | 18 | 15 | 289°C | 0.455 | 1.20 |

FIGURE 2

POLYIMIDE PREPARATION FROM ALKYLATED BENZIDINES

| Example | R₁ | R₂ | Initial Reaction Temp (°C) | Polyamic Acid Reaction Time (hr) | % Solids Polyamic Acid Solution | % Solids Polyimide Solution | Polyimide Film Tg | Polyimide Film Inh. Visc. |
|---|---|---|---|---|---|---|---|---|
| 4 | H | CH₃ | -10 | 17 | 20 | 10 | 352 | .874 |

FIGURE 3
Irradiation of Various Polyimide Homopolymers

| Run | Diamine Example | UV Time (min.) | $P(O_2)^a$ (Barrers) | $\alpha(O_2/N_2)^a$ (based on P) |
|---|---|---|---|---|
| 1 | 1 | 30 | 44.38/14.25 | 3.80/8.71 |
| 2 | 2 | 60 | 20.2/21.8 | 4.56/6.82 |
| 3 | 3 | 30 | 50.06/41.67 | 3.49/5.54 |
| 4 | 4 | 60 | 5.47/5.71 | 5.60/6.52 |

$^a$ before irradiation/after irradiation

GAS SEPARATING MEMBRANES FROM POLYIMIDE POLYMERS AND A PROCESS FOR USING THE SAME

TECHNICAL FIELD

The present invention relates to polymeric membranes, and in particular, to polymeric membranes formed from surface-modified polyimides and a process for using such membranes to separate gaseous mixtures into their respective components.

BACKGROUND OF THE INVENTION

The ever-increasing demand for cryogenic gases has led to a search for improved processes for separating the respective components of various gaseous mixtures, including air. Considerable investigation is being conducted in the area of semi-permeable polymeric membranes wherein such membranes exhibit selectivity toward the passage of one or more components of a gaseous mixture through the membrane.

Commercial applications for gas separation devices based on polymeric materials rely, in part, on maximizing the overall gas flux through the membrane. T. H. Kim, et al., J. Appl. Poly. Sci., 34 1767 (1987), report that membrane gas flux is related to the average space between the polymer chains. The investigators indicate that the density of the polymer can also be correlated to the overall gas flux.

The success of commercial gas separation applications utilizing polymeric membranes depends upon the identification of polymers having sufficiently high gas flux, high selectivity and good thermo-mechanical properties. High overall flux values are typically exhibited in polymers having low chain-chain interactions as exemplified by polymers such as poly(dimethylsiloxane) and poly(4-methyl-1-pentene). Materials having high gas flux values typically possess low glass transition temperatures (Tg) because of low chain-chain interactions in the polymeric material. As a consequence, these materials typically require special processing conditions to build in chemical and/or physiochemical crosslinking if such materials are to be employed in other than low application temperatures. In contrast, polymers having strong chain-chain interactions typically possess rather high Tg values and often exhibit rather low gas flux values.

Polyimides, which generally have strong chain-chain interactions and high Tg values, have been reported to exhibit rather high gas flux values when certain structural moieties are present. Specifically, U.S. Pat. No. 3,822,202 (1974); Re 30,351 (1980) discloses a process for separating fluids using a semi-permeable membrane formed from polyimides, polyesters or polyamides. The repeating units of the main polymer chain have at least one rigid divalent sub-unit, the two main chain single bonds extending therefrom which are not colinear, which are sterically unable to rotate 360° around at least one of these bonds and have 50% or more of its main chain atoms as members of aromatic rings.

U.S. Pat. No. 4,705,540 discloses a highly permeable aromatic polyimide gas separation membrane and processes for using the membrane. The membrane is formed from an aromatic polyimide in which the phenylenediamine units are rigid and are substituted on all of the positions ortho to the amine nitrogen atoms and the acid anhydride units are essentially all attached to rigid aromatic moieties.

U.S. Pat. Nos. 4,717,393 and 4,717,394 teach polymeric membranes and processes for using such membranes for separating components of a gaseous mixture. The membranes disclosed in both of these patents are formed from semi-flexible, aromatic polyimides prepared by polycondensation of dianhydrides with phenylenediamines having alkyl substituents on all positions ortho to the amine functions, or with mixtures of other non-alkylated diamines, some components having substituents on all positions ortho to the amine functions. Membranes formed from this class of polyimides are stated to exhibit improved environmental stability and gas permeability due to optimization of the molecular free volume. Such membranes can also be photochemically crosslinked which in some instances results in a better performing semi-permeable membrane.

Attempts have been made to prepare membranes having high flux and high selectivity by creating a composite structure on the surface of the polymer by means of a chemical reaction between a labile polymer functionality and some "activating force". Such methods are taught in U.S. Pat. No. 4,657,564 wherein poly(1-trimethylsilylpropyne) is treated with a dilute fluorine gas stream and in U.S. Pat. No. 4,717,393 wherein a polyimide containing a benzophenone-containing linking group is irradiated with a medium pressure mercury lamp.

U.S. Pat. No. 4,838,900 discloses aromatic polyimides prepared by polycondensation of dianhydrides with methylene dianilines having substituents on all positions ortho to the amine functions to form membranes having high gas permeability. The gas permeability of the subject membranes is stated to increase substantially if structurally-rigid dianhydrides are used in combination with the substituted diamines.

Yamada and coworkers. Kobunshi Ronbunshu, 40(1) 35-40 (1983), disclose gas separating membranes formed of a polyimide, polysulfone or poly(ethylene terephthalate) which have been irradiated with ultraviolet light in the presence of a helium, oxygen or nitrogen atmosphere. Kapton H-type polyimide film produced by DuPont De Nemours, Wilmington, Del., which was irradiated by ultraviolet light in an atmosphere of air provided enhanced selectivity in the separation of light gases such as hydrogen and helium.

A need in the art exists for the identification of thin film polymers which provide enhanced selectivity for various gas separation applications while also possessing good mechanical properties and sufficient permeability.

BRIEF SUMMARY OF THE INVENTION

The present invention is a class of semi-permeable polyimide membranes and a process for using such membranes to separate one or more components of a gaseous mixture. The polyimide membranes are prepared from a polyimide having surface-modifiable functionalities comprising repeating units formed from an aromatic dianhydride and a bridged alkylated bisaniline wherein the bridging group of the diamine possesses restricted, rotatably rigid, or low Van Der Haal energy substituents which are orthogonal to the polymer backbone. The polyimide polymer or the membrane formed therefrom is subsequently surface-modified in the presence of an oxygen source by treatment with an activating force such as high energy electromagnetic irradiation or with a free radical source to impart high selectivity to the membrane without causing a large decrease in composite permeance. These surface-modified polyimide membranes provide enhanced selectivity for various gas separation applications including the separation of oxygen and nitrogen from air.

BRIEF DESCRIPTION OF THE FIGURES

FIG. 1 discloses data pertaining to the preparation of polyimides from Bis(4-aminoaryl)methanes.

FIG. 2 discloses data pertaining to the preparation of polyimides from alkylated benzidines.

FIG. 3 discloses data pertaining to the irradiation of various polyimide homopolymers.

DETAILED DESCRIPTION OF THE INVENTION

The present invention relates to a class of surface-modified semi-permeable membranes which exhibit unexpectedly high selectivity properties. The semi-permeable membranes formed of polyimides having surface-modifiable functionalities are prepared by reacting an aromatic dianhydride and a bridged alkylated bisaniline wherein the bridging group of the diamine possesses restricted, rotatably rigid, or low Van Der Waal energy substituents which are orthogonal to the polymer backbone.

The polyimide polymer containing surface-modifiable functionalities or the membrane formed therefrom is then contacted in the presence of an oxygen source with an activating force such as high energy electromagnetic irradiation or a free radical source to form a surface-modified polyimide which exhibits unexpectedly high selectivity than would be expected in view of polymeric membranes known in the art.

The improved selectivity afforded by subjecting the polyimide membranes of the present invention in the presence of an oxygen source with the activating forces disclosed herein is unexpected in view of teachings by Lin and coworkers, Macromolecules, 21, 1165 (1988) which suggest a crosslinking mechanism for a polyimide polymer containing a benzophenone functionality which has been exposed to ultraviolet energy in the presence of an oxygen source. One of ordinary skill in the art would not expect the polyimides of the present invention to undergo surface modification based upon the proposed mechanism disclosed by these investigators.

We have found that membranes having high molecular weight, good mechanical properties and high free volume can be obtained by contacting the specific polyimides according to this invention with an activating force in the presence of an oxygen source to obtain a membrane having high selectivity without suffering a large decrease in composite permeance.

The polyimide polymers from which the membranes are formed comprise repeating units of the general structural formula:

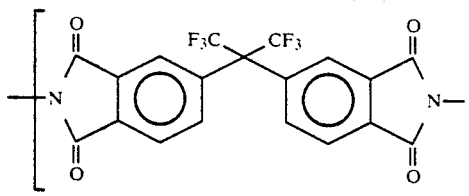

-continued

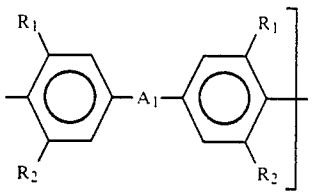

wherein each $R_1$ is independently selected from a hydrogen atom, an alkyl having from 1 to about 8 carbon atoms, aryl or an arylalkylene;

each $R_2$ is independently selected from an alkyl having from 1 to about 8 carbon atoms, perhaloalkyl or an arylalkylene; and $A_1$ is a single bond or

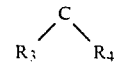

wherein $R_3$ and $R_4$ are independently selected from a hydrogen atom, $CF_3$, $CF_2Cl$, an alkyl having from 1 to about 8 carbon atoms, phenyl, 1-arylalkyl, arylalkylene, naphthyl or a halogen.

Suitable alkyl groups defined by $R_1$ through $R_4$, inclusive, include linear and branched alkyls having from one to about 8 carbon atoms. Preferred alkyl substituents are methyl and isopropyl. The term arylalkylene refers to substituents having the formula $-(CH_2)_nC_6H_5$ wherein n ranges from 1 to about 6 carbon atoms. The preferred bridging groups represented by $A_1$ is a methylene group. Minor amounts of other monomers may be present which do not affect the gas separation properties of the resultant membrane.

The polyimide polymer or the membrane formed therefrom is subsequently contacted in the presence of an oxygen source with an activating force to effect modification of the membrane surface. Suitable activating forces include high energy electromagnetic irradiation. Examples of sources of such electromagnetic irradiation include longwave and shortwave ultraviolet irradiation and X-ray irradiation. Substantial enhancement in selectivity is observed after only ten to fifteen minutes of irradiation and composite selectivities continue to improve with longer irradiation times. Generally, the irradiation time for use of UV sources ranges from about 5 to 30 minutes.

Alternatively, the activating force may be a free radical source which is contacted with the surface of the polymer, such free radical sources including, but not limited to, volatile peresters, peroxides and azo compounds. The surface-modified polymer may then be subjected to thermal activation with or without metal accelerators.

An advantage of the present invention is that photosensitizers are not required to render the polyimide susceptible to oxidative surface modification. However, photosensitizers known in the art may be utilized if desired.

Surface modification of the subject polyimide polymeric membrane is believed to provide a membrane whose bulk, having a combination of high flux and low selectivity, provides mechanical support for the modified surface layer which imparts high selectivity without causing a drastic reduction in the composite permeance. The thickness of the thin film of surface-modified polymer formed at the surface of the polymeric membrane will depend upon the intensity and duration of the high energy electromagnetic radiation source, the concentration of the free radical source and the like. The thickness of the membrane is not critical so long as the membrane has a thickness sufficient to be contiguous.

Moreover, the molecular weight of the polyimide from which the membrane is formed is not critical. However, the polymer should be of sufficient molecular weight so as to enable casting of the polymer into membrane form. Membranes can be prepared according to methods well known in the art and can be used in the form of flat sheets, spiral wound sheets, hollow fiber and the like. Optionally, the membrane can be supported on a permeable support material.

In a preferred embodiment, the semi-permeable membranes are formed of a polyimide having surface-modifiable functionalities comprising repeating units of the general structural formula:

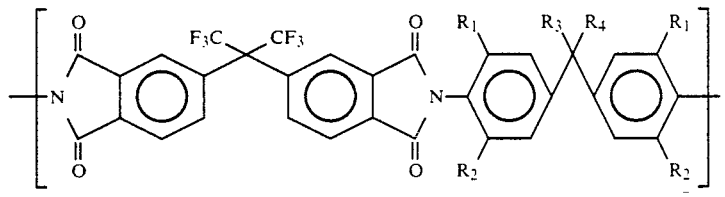

wherein
each $R_1$ is independently selected from a hydrogen atom, an alkyl having from 1 to about 4 carbon atoms or aryl;
each $R_2$ is independently selected from an alkyl having from 1 to about 4 carbon atoms or arylalkylene; and
$R_3$ and $R_4$ are independently selected from a hydrogen atom, $CF_3$, $CF_2Cl$, an alkyl having from 1 to about 4 carbon atoms, phenyl, 1-arylalkyl, arylalkylene or naphthyl.

The above-disclosed polyimides having surface-modifiable functionality or the membrane formed therefrom is preferably contacted in the presence of an oxygen source with an ultraviolet irradiation source. The preferred ultraviolet source emits energy having a wavelength ranging from about 200 to about 300 nm. Suitable sources of oxygen include an atmosphere containing at least 5 mole% oxygen such as air.

The present invention also contemplates a membrane which has been subjected to an activating force having sufficient intensity such that the bulk of the polymer, as opposed to merely the surface, is modified (i.e., the modification to the polymer structure is not limited to the surface). Consequently, for purposes of interpreting the Specification and the appended claims, the term, surface-modifiable functionality, shall refer to structural moieties of the polymer chain which, in the presence of an oxygen source, can undergo structural modification upon being subjected to a suitable activating force as described herein.

The membranes can be used for a wide variety of gas separations and are particularly suited for separating oxygen and nitrogen from air. The process for separating a feedstream containing at least two components having different permeability rates through the membrane comprises bringing the gaseous mixture in contact with the membrane whereby the more permeable component of the gaseous mixture permeates the membrane at a faster rate than the other components thereby separating the components of the feedstream.

The following examples were carried out and are presented to better illustrate the present invention and are not meant to be limiting. Examples 1 through 4 illustrate the preparation of various bisaniline derivatives and Examples 5 and 6 illustrate general and specific preparative routes to the corresponding polyimide polymers. Example 7 discloses the irradiation of the subject polyimide membranes.

EXAMPLE 1

Preparation of 3,3', 5,5'-Tetraisopropyl Methylene Dianiline

In a reaction vessel was placed 10.7 gms (0.05 mole) of 2,6-diisopropylaniline hydrochloride and 150 ml diethyl carbonate. The stirred mixture was heated to 125° C. and 7.1 ml of dimethylsulfoxide was added over a 30-minute period. The solids dissolved and the solution turned purple. Heating was continued for 30 minutes. Crystalline solids formed and were filtered off and identified by NMR as the hydrochloride salt of 3,3', 5,5'-tetraisopropyl methylene dianiline. The filtrate was heated at 125° C. was continued for one hour. This resultant liquid was analyzed by vapor-phase chromatography and found to contain 15.1% 2,6-diisopropylaniline, 1.8% unidentified product and 77.1% 3,3', 5,5'-tetraisopropyl methylene dianiline.

EXAMPLE 2

Preparation of Bis(4-aminophenyl)-1-Naphthyl-2,2,2-Trifluoroethanes 2-naphtyllithium was prepared via the addition of n-butyllithium (192.0 mmole) to an ether solution of 2-bromonaphthalene (192.0 mmole) at −78° C. The 2-naphthyllithium solution was then added to an ether solution of ethyltrifluoroacetate (211 mmole) at −78° C. and the reaction was allowed to warm overnight to room temperature. The reaction mixture was quenched with an ammonium chloride solution followed by addition of dilute HCl. Removal of the solvent yielded a yellow liquid. Vacuum distillation (60° C./0.1 mmHg) produced 2-naphthyltrifluoromethylketone in 71% yield as a light yellow liquid. The product's identity was confirmed by infrared and NMR spectroscopy.

The diamine was prepared via the room temperature addition of trifluoromethanesulfonic acid (66.6 mmole) to a solution of 2-naphthyltrifluoromethylketone (39.6 mmole) in 2,6-dimethylaniline (304 mmmole) under a nitrogen atmosphere. The reaction mixture was heated to 160°–161° C. for 18 hours after which time the mixture was poured hot into an aqueous sodium hydroxide solution (40 g NaOH/200 ml H₂O). Toluene (50 ml) was added to aid in the transfer of the reaction mixture. After vigorous shaking in a separatory funnel, the aqueous layer was removed and the organic layer was washed with more aqueous NaOH solution (40 g NaOH/200 ml H20). Toluene (65 ml) was added to the organic layer and the organic layer was washed with water (2 x 200 ml) and dried over MgSO4 The toluene was removed using a rotary evaporator and the unreacted starting materials were removed by vacuum distillation. The dark purple residue that remained after distillation was recrystallized from toluene and/or toluene/hexane to obtain white to cream-colored crystals (12.9% yield, mp 211.5°–213.0° C.) which were suitable for polymerization. The structure of the diamine product was confirmed by IR and NMR spectroscopy.

EXAMPLE 3

Preparation of Bis(3-Methyl-4-Amino-5-isopropyl Phenyl)-1-Phenyl-2,2,2-Trifluoroethane A 50.00 g. (0.333 mol) portion of trifluoromethanesulfonic acid was slowly added to 1.75 moles of 2-isopropyl-6-methylaniline contained in a one liter, three necked flask equipped with a mechanical stirrer. After thorough mixing had occurred, 43.53g (0.250 mol) of 1,1,1-trifluoroacetophenone was added. The mixture was then heated to 155° C. for 17 hours under nitrogen atmosphere with continuous stirring. Thereafter, the reaction vessel was fitted with a claisen distillation head and the excess 2-isopropyl-6-methylaniline along with some of the acid were removed via vacuum distillation. The residual product was cooled below 80° C. then neutralized with a solution of 40.0 g (1.00 mol) of sodium hydroxide in 200 ml of water. An 800 g portion of toluene was then added with vigorous stirring. After 5 min., stirring was discontinued and the layers were separated. The organic layer was dried over anhydrous magnesium sulfate and the toluene was removed via evaporation. Polymer grade diamine was obtained from the residue after recrystallization followed by vacuum drying at 80°–100° C./5 mm Hg for 24 hours.

EXAMPLE 4

Preparation of Ortho-Hydrazotoluene)

A vigorously stirred mixture of 120 g. of zinc dust 68 gms of ortho-nitrotoluene and 300 ml of methanol was treated dropwise with 250 ml of 30% aqueous sodium hydroxide and the mixture was boiled for several hours. Methanol was removed substantially by distillation and the solids were collected by filtration and extracted with hot ethanol. The ethanol extracts were concentrated and treated first with 50 ml of concentrated aqueous ammonia followed by hydrogen sulfide until the red color of the solution disappeared. The pale yellow crude ortho-hydrazotoluene (26 g. 50% yield), m.p., 158°–162° C., which crystallized from solution throughout the hydrogen sulfide treatment, was removed from time to time. Recrystallization of the crude material from petroleum ether yielded white flakes having a m.p. in agreement with reported values.

EXAMPLE 5

Preparation of Polyimides by Condensing 6F-Dianhydride with Bisanilines

General Procedure: The following procedures were used to prepare polyimides by condensing 5,5'-[2,2,2-trifluoro-1-(trifluoro methyl)ethylidine]bis-1,3-isobenzofuranedione (6F-dianhydride), or derivatives thereof, with the bisanilines according to Examples 1 through 4. Variations in polymerization reaction parameters between the different bisanilines reflect the specific conditions required to obtain good, film-forming polyimides.

Polyamic Acid Preparation

A 20.000 g (0.04502 mol) portion of 6F-dianhydride is added proportionately through the course of 0.5 hr. to a solution of 0.04502 mol of the bisaniline in anhydrous N,N-dimethyl acetamide (DMAC). During the addition, the mixture is stirred mechanically under an inert nitrogen blanket. The initial reaction temperature for a given bisaniline is indicated in FIGS. 1 and 2. The amount of DMAC used is determined by the percent solids concentration indicated in FIGS. 1 and 2. Approximately one hour after the addition of dianhydride, the reaction temperature is brought to 25° C. and the reaction mixture is stirred for the indicated reaction time. This polyamic acid solution is used directly in preparing the corresponding polyimide solution.

Polyimide Preparation

The solids concentration of the polyamic acid solution was adjusted with DMAC values indicated in FIGS. 1 and 2. Acetic anhydride (9.18 g, 0.0900 mol) and 2.27 g (0.0225 mol) of triethylamine were added to the polyamic acid solution. The solution was then heated to 60° C. for 3 hours with stirring. After cooling, the polyimide solution was cast on glass plates. Polyimide films of ca. 100 micron thickness were obtained after vacuum drying at 70° C./200mmHg for 8 hours, then 100° C./0.1 mmHg for 16 hrs. followed by 225° C. at 0.1 mmHg for 8 hours. The polyimide films obtained after this drying procedure were determined to contain less than 0.5 wt% residual DMAC.

EXAMPLE 6

Preparation of 6-FDA/2-Naphthyl-2,2,2-Trifluoroethylene-4,4'-Bis(2,6-Dimethylaniline)

The polyamic acid solution was prepared by the slow (over about 20 minutes) addition of dry 6-FDA (10.2 mmole) to a cooled (−5° C.) solution of the dry diamine (10.2 mmole) according to Example 2 in dry DMAC (418 mmole). The reaction was stirred under nitrogen and was allowed to warm to room temperature after addition was completed. After two days, the dark green polyamic acid solution was treated with fresh acetic anhydride (40.8 mmole) and triethylamine (10.8 mmole). The reaction mixture was heated to 60° C. for three hours, after which time the light brown polyimide solution was cooled to room temperature and poured into methanol (1600 ml). The white polymer precipitated out of solution, was filtered and dried. The dried polymer was redissolved, the solution filtered and the polymer was reprecipitated, filtered and dried again before use. The structure of the purified polyimide was confirmed by standard spectrographic techniques.

EXAMPLE 7

Irradiation of Homopolyimide Polymers

Dense films of the individual homopolymers prepared from the diamines according to Examples 1 through 4 were irradiated in the presence of an oxygen source (i.e., air) for various lengths of time using a Hanovia 450 watt medium pressure UV lamp (Ace Glasswear Catalog #7825-34). The gas permeabilities of the subject polyimides were measured using either a CSI-135 volumetric cell (if $P(O_2) > 10$ Barrers) or a CSI-89 pressure rise cell (if P(O$_2$)<10 Barrers). Lamp intensities (irradiances) were measured using either an International Light IL1350 photometer-radiometer equipped with an XRD140B photoresist cell (which detects lights of wavelengths 300-400 nm) or the same photometer-radiometer equipped with an SED240/W Solar Blind Vacuum Photodiode (which detects light of 190-320 nm).

Polyimide films were cast from either 10% w/v N,N-dimethylacetamide (DMAC) or 1,2-dichloroethane solutions onto glass plates using the ring technique disclosed by Moe and coworkers J. Appl. Polym. Sci., 36, 1833, (1988). Films cast from 1,2-dichloroethane were air dried under a nitrogen purge for several hours, removed from the glass and heat treated under vacuum (0.1 mmHg) for six hours at 100° C. and for eight hours at 225° C. Films cast from DMAC were dried in a vacuum oven (200 mmHg, 70° C.) overnight before they were removed from the glass and heat treated under vacuum (0.1 mmHg) for six hours at 100° C. and for eight hours at 225° C.).

The resultant surface-modified membranes were tested for oxygen permeance and O$_2$/N$_2$ selectivity, the results of which are presented in FIG. 3 Runs 1 through 4 demonstrate that the oxidative surface modification of membranes prepared utilizing the polyimides of the present invention provide enhanced selectivity without causing an inordinately large decrease in composite permeance. In particular, Run 1 provides greater than a 100% increase in selectivity following ultraviolet irradiation for 30 minutes at a wavelength ranging from 200 to about 300 nm.

The membranes according to the present invention are unique in that the large increase in selectivity following oxidative surface modification is afforded without the use of added components such as sensitizers, chain carriers and the like, which eliminates complications in the membrane formation step, the surface modification step and the use of the resulting membranes to separate various gaseous mixtures.

Having thus described the present invention, what is now deemed appropriate for Letters Patent is set out in the following appended claims.

We claim:

1. A semi-permeable membrane formed of a polyimide homopolymer having surface modifiable functionalities, the polyimide homopolymer comprising repeating units of the general structural formula:

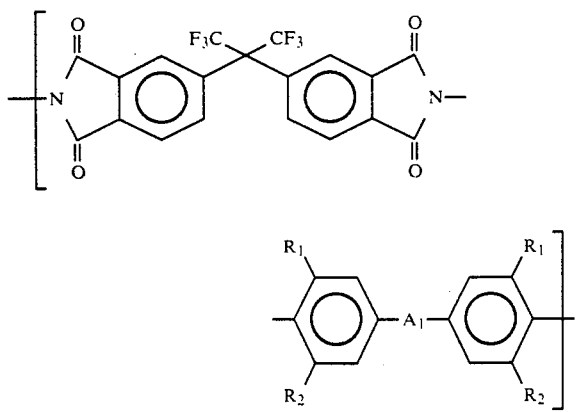

wherein
each R$_1$ is independently selected from a hydrogen atom, an alkyl having from 1 to about 8 carbon atoms, aryl or an arylalkylene;
each R$_2$ is independently selected from an alkyl having from 1 to about 8 carbon atoms, perhaloalkyl or an arylalkylene; and
A$_1$ is a single bond or

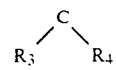

wherein R$_3$ and R$_4$ are independently selected from a hydrogen atom, CF$_3$, CF$_2$Cl, an alkyl having from 1 to about 8 carbon atoms, phenyl, 1-arylalkyl, arylalkylene, naphthyl or a halogen;
wherein the polyimide homopolymer having surface-modifiable functionalities is contacted in the presence of an oxygen source with a source of high energy electromagnetic irradiation or a free radical source to affect modification of the polymer surface.

2. The semi-permeable membrane according to claim 1 wherein the oxygen source is an atmosphere containing at least 5% oxygen.

3. The semi-permeable membrane according to claim 2 wherein the atmosphere containing at least 5% oxygen is air.

4. The semi-permeable membrane according to claim 1 wherein the source of high energy electromagnetic irradiation is ultraviolet irradiation.

5. The semi-permeable membrane according to claim 4 wherein the ultraviolet irradiation source is focused between about 200 and 300 nm.

6. The semi-permeable membrane according to claim 4 wherein the polyimide is contacted with the ultraviolet irradiation source in the presence of a photosensitizer.

7. The semi-permeable membrane according to claim 1 which has been contacted with a free radical source selected from the group consisting of volatile peresters, peroxides and azo compounds.

8. The semi-permeable membrane according to claim 1 wherein R$_1$ and R$_2$ are isopropyl and R$_3$ and R$_4$ are hydrogen atoms.

9. The semi-permeable membrane according to claim 1 wherein R$_1$ and R$_2$ are methyl, R$_3$ is CF$_3$ and R$_3$ is naphthyl.

10. The semi-permeable membrane according to claim 1 wherein R$_1$ is methyl, R$_2$ is isopropyl, R$_3$ is CF$_3$ and R$_4$ is phenyl.

11. A process for separating a gaseous mixture containing two or more components, the process comprising: bringing the gaseous mixture into contact with one side of the semi-permeable membrane according to claim 1 whereby one component selectively permeates through the membrane at a different productivity rate than at least one other component.

12. The process according to claim 11 wherein the gaseous mixture comprises nitrogen and oxygen.

13. A semi-permeable membrane formed of a polyimide homopolymer having surface modifiable functionalities, the polyimide homopolymer comprising repeating units of the general structural formula:

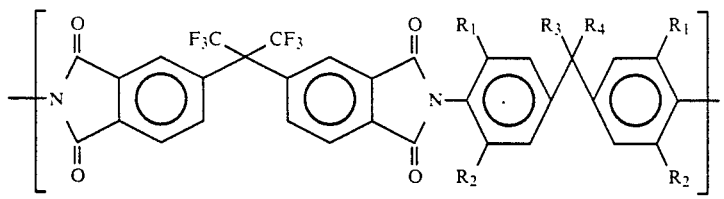

wherein
- each $R_1$ is independently selected from a hydrogen atom, an alkyl having from 1 to about 4 carbon atoms or aryl;
- each $R_2$ is independently selected from an alkyl having from 1 to about 4 carbon atoms or arylalkylene; and
- $R_3$ and $R_4$ are independently selected from a hydrogen atom, $CF_3$, $CF_2Cl$, an alkyl having from 1 to about 4 carbon atoms, phenyl, 1-arylalkyl, arylalkylene or naphthyl;

wherein the polyimide homopolymer having surface-modifiable functionalities is contacted in the presence of an oxygen source with a source of high energy electromagnetic irradiation or a free radical source to affect modification of the polymer surface.

14. The semi-permeable membrane according to claim 13 wherein the ultraviolet irradiation source is focused between about 200 and 300 nm.

15. The semi-permeable membrane according to claim 14 wherein the oxygen source is an atmosphere containing at least 5 mole % oxygen.

16. The semi-permeable membrane according to claim 15 wherein the oxygen source is air.

17. A process for separating a gaseous mixture containing two or more components, the process comprising: bringing the gaseous mixture into contact with one side of the semi-permeable membrane according to claim 13 whereby one component selectively permeates through the membrane at a different productivity rate than at least one other component.

18. The process according to claim 17 wherein the gaseous mixture comprises nitrogen and oxygen.

* * * * *